May 23, 1961  E. W. GORTER ET AL  2,985,591
FERRITE CORE AND METHOD OF MAKING
Filed Oct. 25, 1957

INVENTORS
EVERT WILLEM GORTER
CORNELIS JACOBUS ESVELDT
HENDRIK VAN DER HEIDE
BY

AGENT

United States Patent Office 2,985,591
Patented May 23, 1961

2,985,591

FERRITE CORE AND METHOD OF MAKING

Evert Willem Gorter, Cornelis Jacobus Esveldt, and Hendrik van der Heide, all of Eindhoven, Netherlands, assignors to North American Philips Company, Inc., New York, N.Y., a corporation of Delaware Filed Oct. 25, 1957, Ser. No. 692,377

Claims priority, application Netherlands Oct. 30, 1956

5 Claims. (Cl. 252—62.5)

Our invention relates to magnetic cores having a substantially rectangular hysteresis loop and to methods of making the same.

Such cores are of considerable importance for a variety of applications. For example, they are used in magnetic memories (see, for example, W. N. Papian, Proceedings of the Institute of Radio Engineers, April 1952, pages 475–478, and D. R. Brown and E. Albers-Schoenberg, Electronics, April 1953, pp. 146–149). Such magnetic memories are used, for example, in computers and automatic pilots. Another application of these cores is in magnetic switches.

For many applications, particularly where high-frequency alternating currents are applied to the core, it is desirable that eddy-current losses be minimized and to this end cores constituted of ferromagnetic oxides are used. Certain of these ferromagnetic oxides have been found to exhibit substantially rectangular hysteresis loops. However, if these materials are to be made into cores which are to be used in magnetic memories and switches, certain minimum properties must be realized.

One such condition is that the "squareness ratio" $(R_s)_{max.}$ have a sufficiently high value. For many applications an $(R_s)_{max.}$ of at least 0.8 is acceptable.

The term $(R_s)_{max.}$ as used herein is defined as (see Fig. 1):

$$\left(\frac{B_{(-1/2H_m)}}{B_{(H_m)}}\right)_{max.}$$

Another is for the value of $H_m$ to be less than 5 oersteds.

It is a principal object of our invention to provide a new ferromagnetic oxide material meeting the aforesaid requirements.

This and further objects of our invention will appear as the specification progresses.

In accordance with our invention we prepare a finely-divided mixture of about 49–52 mol percent $Fe_2O_3$, about 14–40 mol percent MgO, about 9–35 mol percent NiO, and about 0.5–1.5 mol percent of CoO, form this mixture into a body of desired shape and dimensions, and sinter this body at a temperature of about 1350° C. to 1450° C. in at atmosphere containing more oxygen than air for a time sufficient to form a ferrite. The sintered body is then subjected to the action of a magnetic field, i.e., either alternating or direct current produced, while at a temperature between its Curie temperature, i.e. the temperature above which the initial permeability is less than 10% of its maximum value and the saturation magnetization is less than 1% of the value at room temperature, and 150° C.

The length of time during which the magnetic field is applied depends upon the temperature at which it is applied. If the magnetic field is applied at a high temperature, i.e., relatively near to but below the Curie temperature, the duration of the thermal treatment in the magnetic field can be shortened. Conversely, if the magnetic field is applied at a lower temperature, say 200° C., the duration of the thermal treatment in the magnetic field must be greater.

The effect obtained by the thermal treatment in a magnetic field is lost if followed by thermal treatment for the same period of time without the presence of the magnetic field in the aforesaid temperature range. Hence, removal of the field during the cooling process at a high temperature has a more deleterious effect than removal at a low temperature.

Application of the magnetic field at temperatures above the Curie temperature has no adverse effect on the final result. Consequently, it is not essential to actually determine the Curie point of the material but the magnetic field may, instead be applied at a temperature sufficiently high to be certain that it is in excess of the Curie temperature.

If the treatment in the magnetic field is carried out below 150° C. the effect can be achieved, but the length of time required is so long that such method is of no practical value.

It should be noted that pre-firing or pre-sintering of the shaped mass of oxides followed by grinding, compacting, and re-sintering may be employed to insure a more thoroughly reacted product, i.e., a more homogeneous product. Such pre-firing is generally carried out at 750° C. to 1000° C. This feature is not essential, however, and may be omitted.

Similarly, instead of oxides, compounds such as carbonates, nitrates, oxalates, etc. which decompose upon heating and form oxides may be used. Likewise, it is considered obvious that, if desired, the body, after sintering, can be cooled to room temperature and then reheated to a temperature below the Curie temperature but above 150° C. before applying a magnetic field.

Cores made according to the invention in addition to exhibiting the desired characteristics also exhibit generally values of $H_m$ which are less than 3.5 oersteds. For many of the cores produced there is a range of field strength at which the value of $R_s$ is substantially equal to that of $(R_s)_{max.}$. The higher the latter value, the greater is the range of field strengths. At different temperatures, this range lies between different values of the field strength, while the values of $(R_s)_{max.}$ are substantially the same at different temperatures. Consequently, when these ranges coincide at different temperatures, these magnet cores have the advantage of a substantially constant value of $R_s$ at a given value of $H_m$ through a certain temperature range, so that $R_s$ is substantially independent of the temperature at this value of $H_m$. This property is a particular feature of magnet cores prepared by sintering together about 29.4 mol percent MgO, about 19.6 mol percent NiO, 1.0 mol percent CoO and 50.0 mol percent $Fe_2O_3$.

In addition to the aforesaid properties, the cores according to the invention exhibit the further feature that their switching times lie between 10 and 20 microseconds.

The invention will be described in connection with the accompanying drawing in which.

Figure 1:
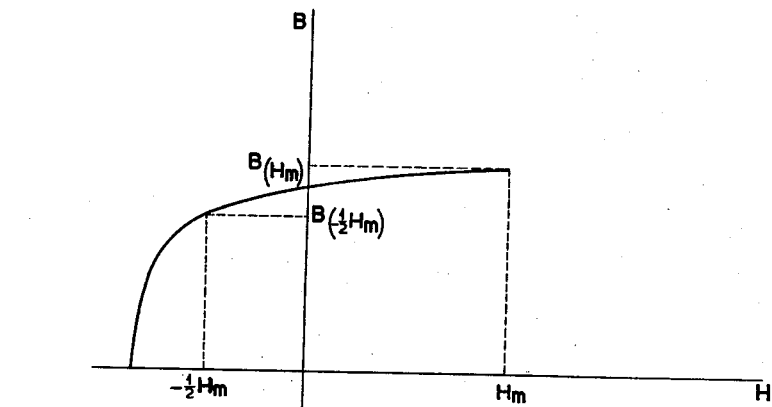
Fig. 1 is a demagnetization curve of a magnetic core.

Referring first to Fig. 1, the curve shown is a demagnetisation curve of a magnetic core obtained by applying a reversing field to the core to which a field of $H_m$ oersted has been applied yielding a flux density $B_m$. Another point on this curve is that at $-\frac{1}{2}H_m$, i.e. with a field applied in the opposite direction equal to onehalf of the applied field $H_m$. From those values, namely $B_{(H_m)}$ and $B_{(-\frac{1}{2}H_m)}$, the value of $R_s$ is defined as:

$$\frac{B_{(-1/2H_m)}}{B_{(H_m)}}$$

For a certain value of $H_m$ this quotient reaches the maximum value $(R_s)_{max}$.

EXAMPLE I

A mixture of $MgCO_3$, $NiCO_3$, $CoCO_3$ and $Fe_2O_3$ in the proportions indicated in the following table was ground in ethyl alcohol in a ball mill for 16 hours and subsequently pre-fired in air at 800° C. for 2 hours. The pre-fired material was ground in an oscillating mill with ethyl alcohol for 4 hours, the product dried, and subsequently compressed to form rings which were evenly heated in oxygen to 1420° C., maintained at this temperature for 2 hours and subsequently cooled. These rings do not have a hysteresis loop of a shape such that $(R_s)_{max} \geq 0.8$. These rings, however, were subsequently heated in air to 500° C. and cooled in a direct-current produced magnetic field of about 100 oersteds in a period of 3 hours. In the appended table the composition of the initial material, converted into metal oxides, the squareness ratio $(R_s)_{max}$ at room temperature and the associated driving field strength $H_m$ are given.

Table

| mol. percent | | | | $(R_s)_{max}$ | $H_m$ oersted |
|---|---|---|---|---|---|
| MgO | NiO | CoO | $Fe_2O_3$ | | |
| 39.8 | 10.0 | 0.7 | 49.5 | 0.95 | 2.3 |
| 39.4 | 9.9 | 0.7 | 50.0 | 0.85 | 2.3 |
| 39.0 | 9.8 | 0.7 | 50.5 | 0.95 | 3.5 |
| 37.9 | 9.5 | 0.7 | 51.9 | 0.85 | 1.5 |
| 38.6 | 9.7 | 1.2 | 50.5 | 0.80 | 2.4 |
| 38.3 | 9.6 | 1.2 | 50.9 | 0.85 | 3.2 |
| 37.6 | 9.4 | 1.2 | 51.8 | 0.85 | 2.3 |
| 29.6 | 19.7 | 0.7 | 50.0 | 0.95 | 1.2 |
| 29.4 | 19.6 | 1.0 | 50.0 | 0.95 | 3.0 |
| 29.1 | 19.4 | 1.0 | 50.5 | 0.90 | 2.2 |
| 28.8 | 19.2 | 1.0 | 51.0 | 0.90 | 2.3 |
| 28.3 | 18.8 | 0.9 | 52.0 | 0.80 | 2.6 |
| 14.6 | 34.2 | 0.7 | 50.5 | 0.80 | 2.4 |
| 14.5 | 33.8 | 0.7 | 51.0 | 0.85 | 2.2 |
| 14.2 | 33.2 | 0.7 | 51.9 | 0.90 | 2.1 |

EXAMPLE II

In the manner described in Example I, a mixture of $MgCO_3$, $NiCO_3$, $CoCO_3$ and $Fe_2O_3$ in a ratio corresponding to 24.9 mol. percent of MgO, 19.6 mol. percent of NiO, 1.0 mol. percent of $CoCO_3$ and 50.0 mol. percent of $Fe_2O_3$ was pre-fired and compressed into rings which were heated in oxygen in a continuous furnace. The cores passed through the zone of maximum temperature, 1420° C., in 15 minutes. Subsequently the rings were cooled to room temperature. The cores did not have a hysteresis loop of such shape that $(R_s)_{max} \geq 0.8$.

One ring was heated in a direct-current produced magnetic field of about 100 oersteds at 400° C. for 8 hours. Then the field was switched off. At room temperature, this ring had an $(R_s)_{max}$ of 0.30 and an $H_m$ of 2 oersteds.

A second ring was heated at 300° C. in a direct-current produced magnetic field of about 100 oersteds for 8 hours after which the field was switched off. At room temperature, this ring had an $(R_s)_{max}$ of 0.65 and an $H_m$ of 2 oersteds.

A third ring was heated at 200° C. in a direct-current produced magnetic field of about 100 oersteds for about 8 hours, after which the field was switched off. At room temperature, this ring had an $(R_s)_{max}$ of 0.65 and an $H_m$ of 1.9 oersteds.

A fourth ring was heated at 200° C. in a direct-current produced magnetic field of about 100 oersteds for 24 hours, after which the field was switched off. At room temperature, this ring had an $(R_s)_{max}$ of 0.90 and an $H_m$ of 1.9 oersteds.

A fifth ring was heated to 500° C. At this temperature, a direct-current produced magnetic field of about 100 oersteds was applied. The ring was cooled to about 150° C. in this field in about 4 hours, after which the field was switched off. At room temperature, this ring had an $(R_s)_{max}$ of 0.95 and an $H_m$ of 1.6 oersteds.

Figure 2:
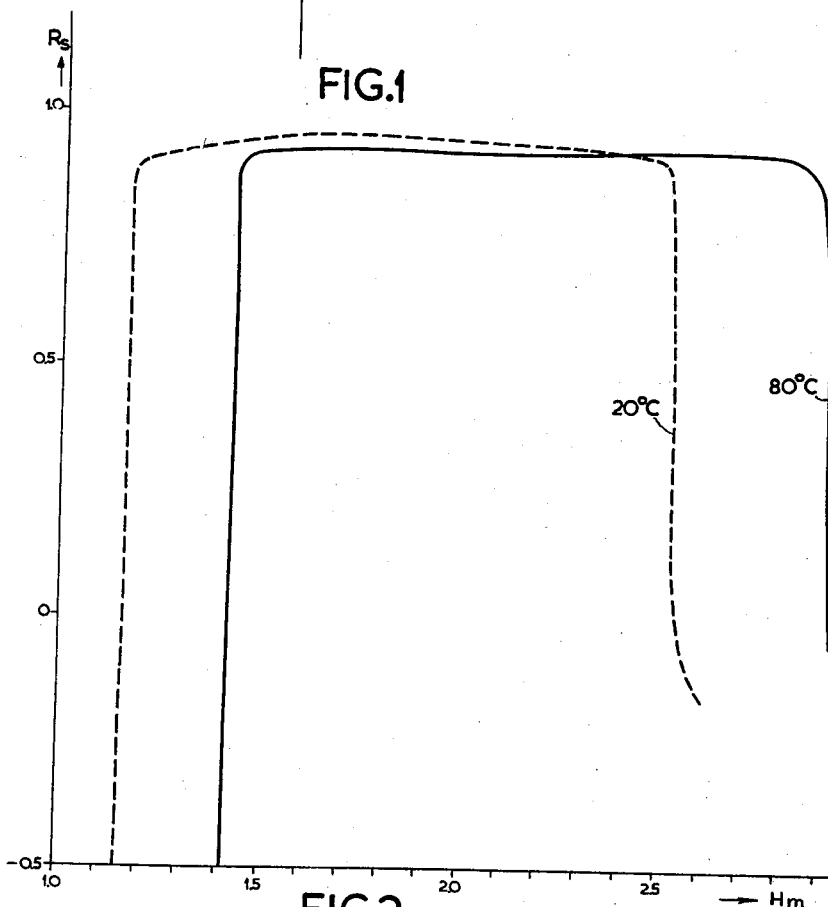
Fig. 2 is a curve showing the relationship between $R_s$ and $H_m$ at different temperatures for a core according to the invention; and in connection with the following examples.

In addition, the values of $R_s$ at different values of $H_m$ were measured on the latter ring at 20° C. and at 80° C. The results of these measurements are shown in Fig. 2, the value of $H_m$ being plotted horizontally and the value of $R_s$ being plotted vertically.

While we have described our invention in connection with specific embodiments and applications, other modifications thereof will be readily apparent to those skilled in this art without departing from the spirit and scope of the invention as defined in the appended claims.

What is claimed is:

1. A method of manufacturing a magnetic core having a substantially rectangular hysteresis loop comprising the steps, forming a finely-divided mixture of about 49–52 mol. percent $Fe_2O_3$, about 14–40 mol. percent MgO, about 9–35 mol. percent NiO, and about 0.5–1.5 mol. percent CoO, compacting said mixture into a body of desired shape and dimensions, heating said body to a temperature of about 1350° to 1450° C. in an atmosphere containing more oxygen than air to form a ferrite, cooling said body, and subjecting said sintered body to the action of a magnetic field while at a temperature between its Curie temperature and about 150° C. to produce a core having an $(R_s)_{max}$ at least equal to 0.8 and an $H_m$ less than 5 oersteds.

2. A method as claimed in claim 1, in which the sintered body is cooled to room temperature and subsequently subjected to the action of a magnetic field at said temperature.

3. A method as claimed in claim 1, in which the initial mixture has a composition which corresponds to 50.0 mol. percent of $Fe_2O_3$, 29.4 mol. percent of MgO, 19.6 mol. percent of NiO and 1.0 mol. percent of CoO.

4. A magnetic core particularly adapted for use in magnetic memories and magnetic switches comprising a sintered reaction product of about 49–52 mol. percent $Fe_2O_3$, about 14–40 mol. percent MgO, about 9–35 mol. percent NiO, and about 0.5–1.5 mol. percent CoO, and made in accordance with the method of claim 1, said core having substantially rectangular hysteresis loop with an $(R_s)_{max}$ at least equal to about 0.8 and a value of $H_m$ less than about 5 oersteds.

5. A magnetic core as claimed in claim 4 in which the oxides are in the proportions corresponding to 50.0 mol. percent $Fe_2O_3$, 29.4 mol. percent MgO, 19.6 mol. percent NiO, and about 1.0 mol. percent CoO.

References Cited in the file of this patent

UNITED STATES PATENTS

| | | |
|---|---|---|
| 1,997,193 | Kato et al. | Apr. 9, 1935 |
| 2,551,711 | Snoek et al. | May 8, 1951 |
| 2,568,881 | Albers-Schoenberg | Sept. 25, 1951 |
| 2,656,319 | Berge | Oct. 20, 1953 |
| 2,723,239 | Harvey | Nov. 8, 1955 |
| 2,762,778 | Gorter et al. | Sept. 11, 1956 |
| 2,827,437 | Rathenau | Mar. 18, 1958 |

FOREIGN PATENTS

| | | |
|---|---|---|
| 1,100,865 | France | Apr. 13, 1955 |
| 201,004 | Australia | Feb. 22, 1956 |
| 756,374 | Great Britain | Sept. 5, 1956 |

OTHER REFERENCES

Harvey et al.: September 1950, pages 344–347, R.C.A. Review.

Weil: Comptes Rendus, March 24, 1952, pages 1351 and 1352.

Bozorth et al.: Physical Review, Sept. 15, 1955, page 1792.